UNITED STATES PATENT OFFICE.

ANDERS JOHN OSTBERG AND ALBERT KENNY, OF RICHMOND, NEAR MELBOURNE, VICTORIA, AUSTRALIA, ASSIGNORS TO THE STANDARD RUBBER WORKS PROPRIETARY LIMITED, OF MELBOURNE, VICTORIA, AUSTRALIA, A CORPORATION OF VICTORIA.

PROCESS OF MANUFACTURE OF SPONGE RUBBER.

1,422,884.     Specification of Letters Patent.     Patented July 18, 1922.

No Drawing.     Application filed August 18, 1920. Serial No. 404,340.

*To all whom it may concern:*

Be it known that we, ANDERS JOHN OSTBERG and ALBERT KENNY, citizens of the Commonwealth of Australia, and residents of Richmond, near Melbourne, in the State of Victoria, and said Commonwealth, have invented certain new and useful Processes of Manufacture of Sponge Rubber, of which the following is a specification.

This invention relates to an improved rubber material of a spongy nature.

Hitherto spongy rubber material has been not only difficult to produce but owing to the chemical employed as an expansive agent usually carbonate of ammonia, it has been practically impossible to produce rubber material of a spongy, soft and pliable nature which will not harden and perish with age nor one which will produce a product of even porous texture.

This invention has been devised in order to obviate existing defects and to provide such a material and a process of producing a highly satisfactory spongy rubber material of even porous condition which is soft and which will retain its softness and condition for a considerable period without perishing.

The essential feature embodied in the invention consists in the mixing of mineral oil or spirit of a volatile nature such as benzine with the ingredients comprising the body of the material preparatory to vulcanizing to the form required and the use of such oil or spirit results in producing a material of soft and spongy nature which will retain its condition without hardening or perishing for a considerable period and having pores of substantially even formation.

According to this invention the ingredients comprise rubber and crumb rubber or crumb rubber only ground or crushed from discarded or waste material irrespective of whether such rubber has been previously vulcanized; zinc white, sulphur and carbonate of magnesia. These chemicals are added for curative purposes but it will be obvious that any other chemicals which will serve the function of curing the material may be used in lieu thereof.

To the above ingredients is added volatile oil or spirit, either hot or cold, and it is essential that drying or evaporating oils or spirits of the volatile class be employed to successfully carry the invention into practical effect.

The preferred proportions consists in adding approximately 10 pounds of evaporating oil or spirits to every approximate 45 pounds of the total weight of the rubber and chemicals employed.

In a working formula according to this invention the following process may be adopted:

15 lbs. Pará rubber
15 lbs. reclaimed rubber
13 lbs. sulphur
9 lbs. zinc white
1½ lbs. corbonate of magnesia.

It will be obvious that more or less volatile oil or spirit may be added to suit the conditions and the quality of material to be produced.

We desire it to be further understood that in lieu of using rubber and crumb or powdered rubber from discarded material, the whole content of rubber material in the ingredients may consist of crushed or ground rubber from discarded materials or waste rubber.

The rubber employed is broken down and softened by the required amout of oil, as in some instances to every 14 lbs. of rubber up to 20 lbs. of mineral oil may be required.

After the mixing of the materials the mass is rolled into sheets or placed in moulds being preferably subjected to vulcanization in a steam jacketed cylinder for a period of approximately one hour at 40 lbs. steam pressure.

In the process of manufacture the rubber material and the chemicals and oils are mixed together in a suitable mixer and when thoroughly mixed are rolled out in a suitable machine or by suitable mechanism into sheets or placed in the moulds and then vulcanized by either the dry or wet process. After vulcanizing the material is taken out and if not moulded in the vulcanizing is cut or stamped or otherwise shaped to form any suitable article of commerce.

A material manufactured in the manner above described will be of great utility being capable of being used in a wide range of manufacture and has the advantage over existing material in being impervious to atmospheric conditions while the porous texture is of a substantially even grade.

What we claim as our invention and desire to secure by Letters Patent is—

A process for the manufacture of a spongy rubber material comprising mixing together 15 lbs. Pará rubber, 15 lbs. reclaimed rubber, 13 lbs. sulphur, 9 lbs. zinc white, 1½ lbs. carbonate of magnesia, then adding a volatile mineral oil to soften the rubber ingredient, and vulcanizing the same.

Signed at Melbourne in the State of Victoria and Commonwealth of Australia this 30th day of June A. D. 1920.

ANDERS JOHN OSTBERG.
ALBERT KENNY.

Witnesses:
SIDNEY HENDLEY,
A. EDWARD.